(No Model.) 2 Sheets—Sheet 1.

A. MILLS.
MECHANISM FOR UTILIZING TIDE POWER.

No. 424,566. Patented Apr. 1, 1890.

Witnesses:

Inventor:

(No Model.) 2 Sheets—Sheet 2.
A. MILLS.
MECHANISM FOR UTILIZING TIDE POWER.
No. 424,566. Patented Apr. 1, 1890.
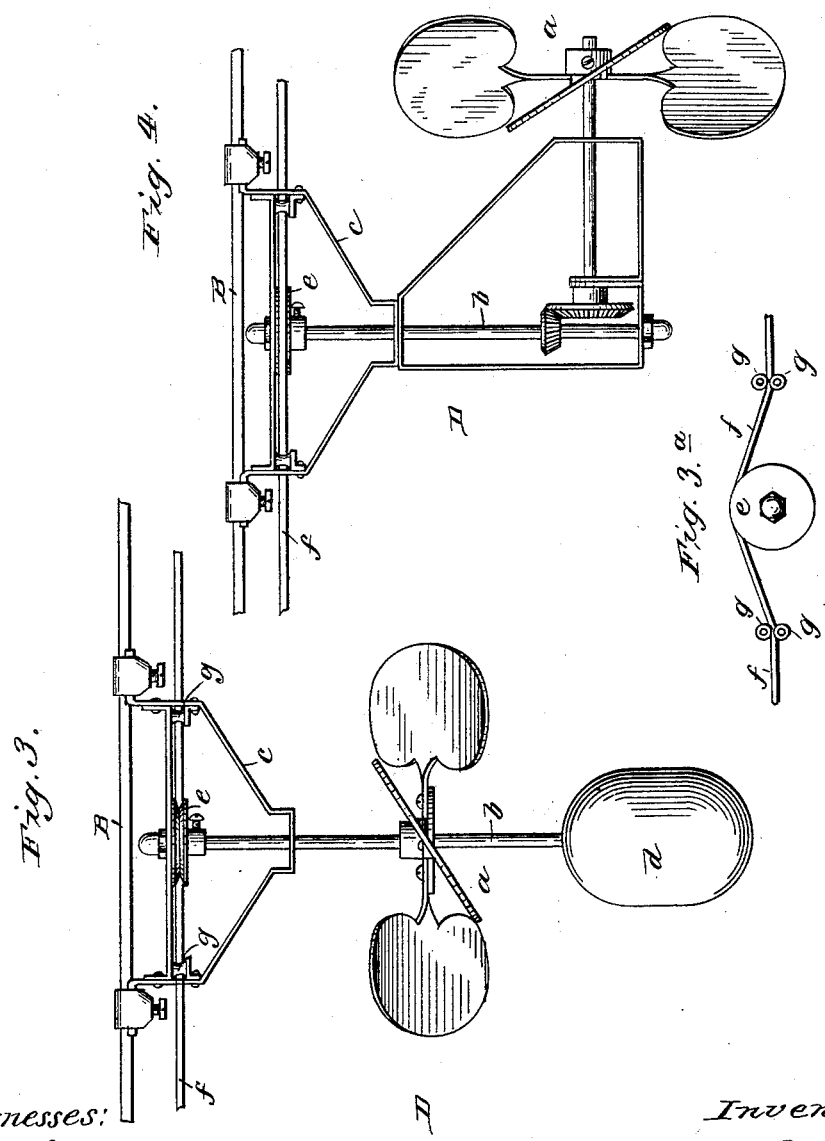

UNITED STATES PATENT OFFICE.

ANSON MILLS, OF THE UNITED STATES ARMY.

MECHANISM FOR UTILIZING TIDE-POWER.

SPECIFICATION forming part of Letters Patent No. 424,566, dated April 1, 1890.

Application filed March 9, 1889. Serial No. 302,699. (No model.)

*To all whom it may concern:*

Be it known that I, ANSON MILLS, of the United States Army, have invented a new and useful Improvement in Mechanism for Utilizing Tide-Power and the Like, of which the following is a specification.

My invention contemplates the employment of a number of motors adjusted to be put in motion by the power of tide, current, or wind, as the case may be, and an endless cable or its equivalent which engages with said motors and is driven by their combined action. As applied to the utilization of tide-power, the motors are suspended in the tideway and adapted to be driven in the same direction whether the tide be flowing in one or the other direction. This can be accomplished by suspending them from supporting fixed cables, which will permit them to swing in one or the other direction with the tide. An endless cable or the like passes from one to the other of these motors and is connected with drums at the shore ends, which are revolved by the cable, the latter itself being driven by motors which conjointly act upon it to keep it in constant revolution. The same plan, *mutatis mutandis*, would be employed for utilizing the power of the wind, the motors being swiveled upon their support, like the ordinary windmill, so as to turn in the direction of the wind.

In the accompanying drawings I have represented one way of carrying my invention into effect.

Figure 1:
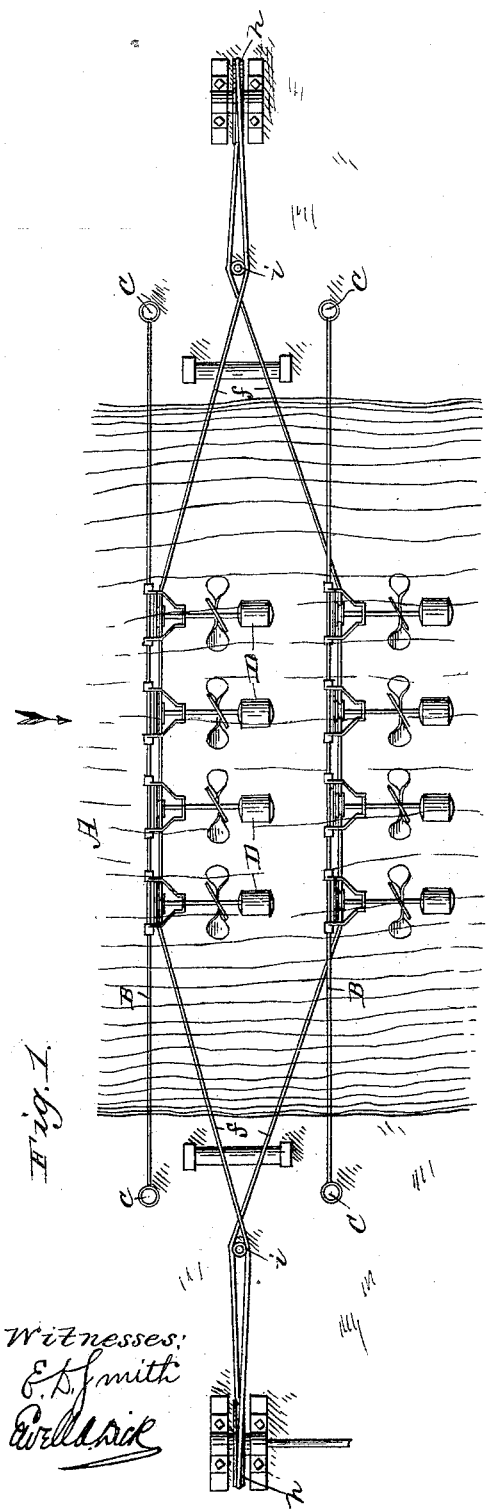
Figure 2:
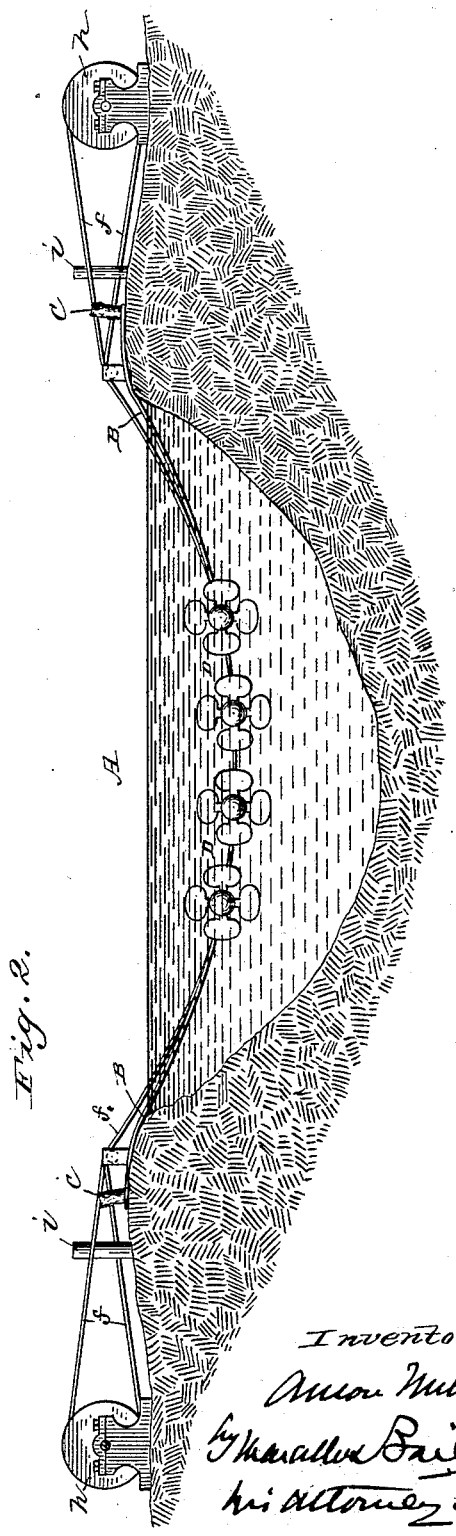

Figure 1 is a plan of the apparatus. Fig. 2 is a side elevation of the same. Fig. 3 is an enlarged view of one of the water-motors. Fig. 3$^a$ is a plan of the cable-driving wheel and guides with which the motor is provided. Fig. 4 is a like view of a modification hereinafter referred to.

The general arrangement of the apparatus is illustrated in Figs. 1 and 2.

A is the tideway.

B are two stationary cables or other suitable supports, which extend parallel with each other and at a suitable distance apart across the tideway, being immersed therein to a suitable depth for the major portion of their length to avoid contact with drift and passing ships, and having their ends anchored to suitable piers C on the opposite banks of the tideway. Upon the immersed portions of these cables are suspended motors D, adapted to be driven by the tide. These motors may be of any suitable construction. As shown in the drawings, and as illustrated more particularly in Fig. 3, each of them comprises a water-wheel $a$, having blades fashioned like those of a propeller, fast on a shaft $b$, which latter is supported and capable of rotation in a frame or yoke $c$, which at its upper end is suspended from one of the cables B. I prefer to attach to the shaft $b$, or to its supporting frame or yoke $c$, a buoy—such as an air-tight vessel $d$—which will buoy or counterbalance the weight of the motor sufficiently to allow it to swing readily with the tide, so that the face of the wheel may stand at right angles, or nearly so, with the flow of the tide. On each shaft $b$ there is a driving-wheel $e$, of suitable construction, to engage the cable $f$ to be driven, which is an endless cable, and on each yoke there are guides $g$, one on each side of the wheel $e$, through which the driven cable passes, these guides being for the purpose of holding the driven cable to its place on the driving-wheel. The guides may consist, as shown in the present instance, of pairs of peripherally-grooved rollers, between which the driven cable passes, as seen in plan in Fig. 3$^a$. A number of these motors are suspended upon each supporting-cable B. The endless cable passes around drums $h$ or the like at the shore ends of the apparatus, being guided thereto by suitable shore-guides $i$, and extends along through the guides $g$ and partly around the driving-wheels $e$ of the motors. It is so arranged that it passes around or about the portions of the peripheries of the set of wheels $e$ on the one cable B opposite those portions of the peripheries of the set of wheels $e$, around or about which it passes on the other cable B. This is exemplified in Fig. 1, where the tide is supposed to be running in the direction of the arrow and the motors having been swung to practically a horizontal position in the same direction.

In the one row of motors the driven cable $f$ passes over the wheels $e$, and in the other row it passes under the wheels $e$. By this arrangement all the motors when in revolution combine to drive the driven cable in one and the same direction. When the tide turns, the motors will be swung in the opposite direction from that shown in Fig. 1; but the direction of movement of the driven cable will be the same as before. The drums $h$ are revolved by the driven cable. From them the power can be taken or stored by any suitable known instrumentalities.

In case it should be desired to employ this general arrangement of appliances for the purpose of utilizing wind-power, this could readily be done. The motor in this instance would, as seen in Fig. 4, have its wheel $a$ made of suitable form to be driven by the force of the wind upon a horizontal shaft $b'$, geared to a vertical shaft $b$, as indicated at $j$, and supported in a frame $k$, swiveled upon said vertical shaft, so as to turn in any direction. The supporting-yoke $c$ of shaft $b$ would be attached, as before, to its support B, which in this instance might be any suitable stiff frame or supporting-beam instead of a cable. The arrangement of the driving-wheels $e$, driven cable $f$, &c., would be substantially the same in their arrangement already described. My invention, however, is more especially adapted to narrow passages (like the Golden Gate) from the ocean to large interior bays. The passage just named has a channel some three hundred feet deep, and hence it is practicable there to submerge the apparatus below possible contact with drift or shipping.

What I claim, and desire to secure by Letters Patent, is as follows:

1. The combination, with one or more fixed cables extending crosswise of the current, of motors having their frames hung thereon so that they may swing under the action of the current in order to adapt themselves thereto, and an endless cable, also extending crosswise of the current, engaging with and driven by said motors and moving with the same as they are swung in one direction or the other by the current, substantially as and for the purposes hereinbefore set forth.

2. The combination of two fixed cables, a series of propeller-motors suspended therefrom, and an endless cable engaging with and driven by the motors carried by said fixed cables, substantially as and for the purposes hereinbefore set forth.

3. The submerged propeller water-motor provided with a buoy $d$ to lighten the weight of the motor and enable it to swing easily under the action of the tide or current, in combination with the motor-support from which said motor is suspended or hung, and to which it is connected by a joint which will permit it to swing bodily in the direction of the flow of the current, substantially as described.

In testimony whereof I have hereunto set my hand this 20th day of February, 1889.

ANSON MILLS.

Witnesses:
EWELL A. DICK,
WILL E. AUGHINBAUGH.